S. W. SMITH.
MOTOR PLOW.
APPLICATION FILED JUNE 2, 1913.

1,233,136.

Patented July 10, 1917.
2 SHEETS—SHEET 1.

Witnesses

Inventor
S. W. Smith.
By
Attorney

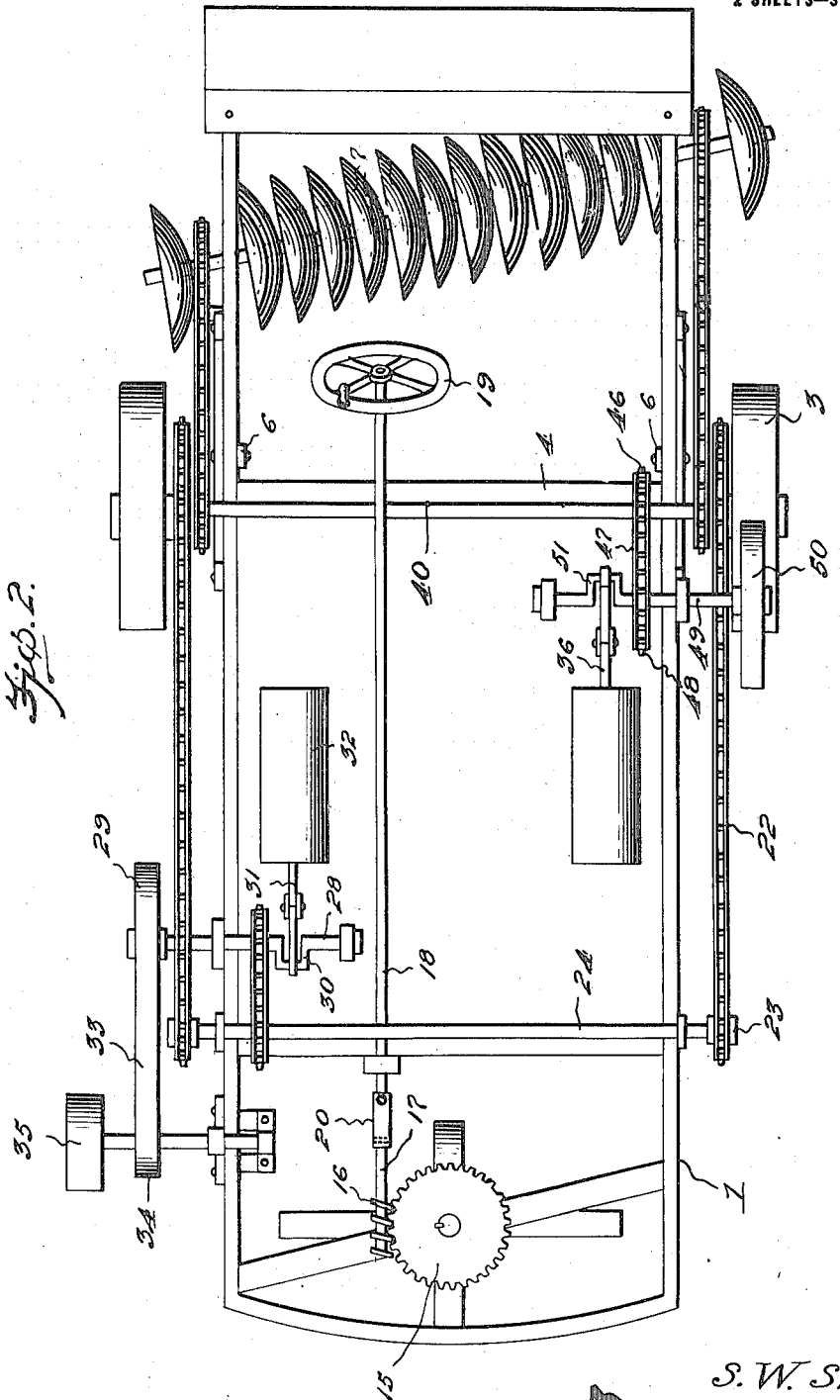

UNITED STATES PATENT OFFICE.

STEPHEN W. SMITH, OF SAN JOSE, CALIFORNIA.

MOTOR-PLOW.

1,233,136.  Specification of Letters Patent.  Patented July 10, 1917.

Application filed June 2, 1915. Serial No. 31,724.

*To all whom it may concern:*

Be it known that I, STEPHEN W. SMITH, a citizen of the United States, residing at San Jose, in the county of Santa Clara and State of California, have invented certain new and useful Improvements in Motor-Plows; and I do hereby declare the following to be a full, clear, and exact description of the invention, such as will enable others skilled in the art to which it appertains to make and use the same.

The invention relates to a motor plow.

The object of the present invention is to provide a simple, practical and efficient motor plow in which the wheels will be arranged in advance of the disks so that the soil will be thrown in a loose and soft mellow condition for planting.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings

Fig. 2 is a plan view of the same.

Like numerals of reference designate corresponding parts in all the figures of the drawings.

Figure 1:
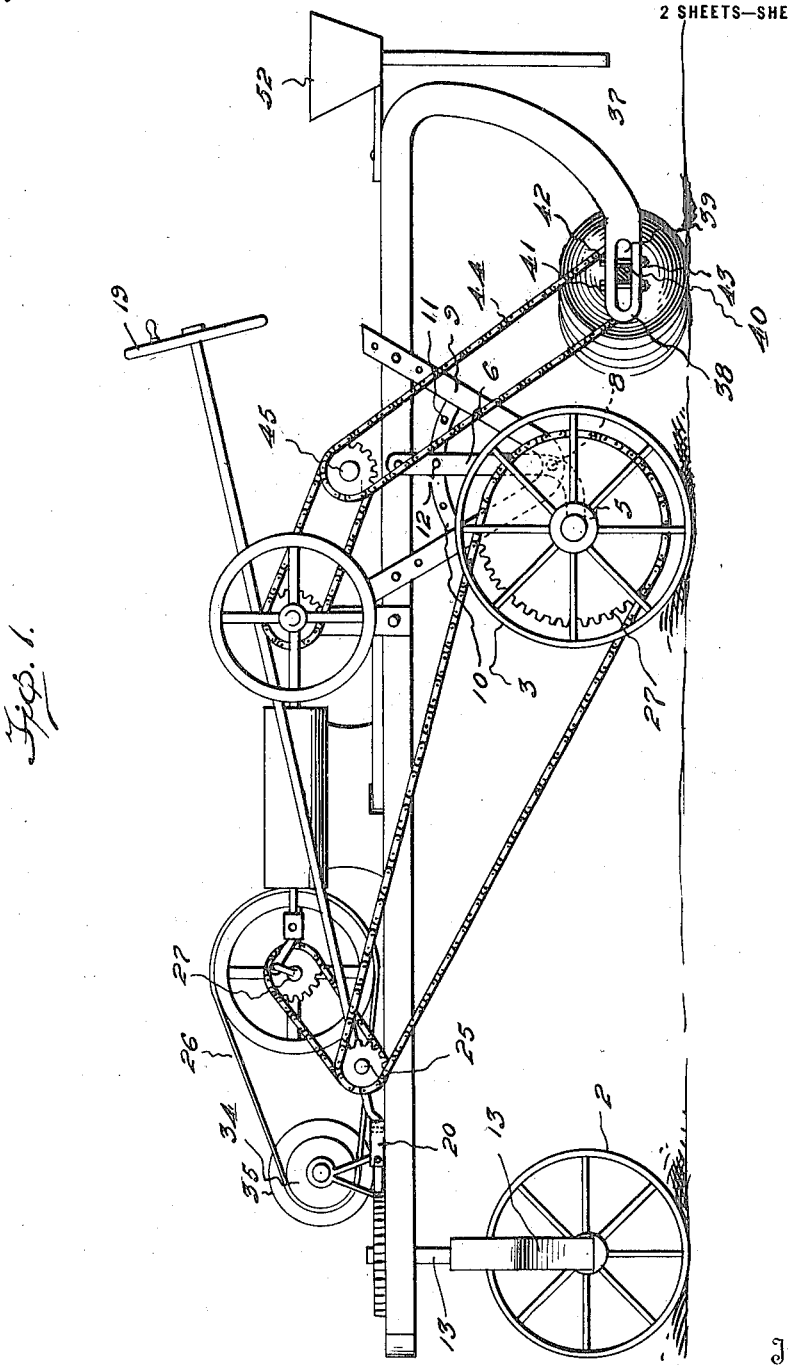
Figure 1 is a side elevation of a motor plow constructed in accordance with this invention.

In the accompanying drawings in which is illustrated the preferred embodiment of the invention, 1 designates the plow frame of substantially rectangular form constructed of steel bars or other suitable material and supported by a front caster wheel 2, rear traction or carrying wheels 3 mounted on a transverse axle 4 which is journaled in suitable bearings 5 of approximately L-shaped adjusting levers 6 adapted to raise and lower the frame for varying the depth, which cultivator disks 7 penetrate the soil. The adjusting levers 6 which are approximately L-shaped are fulcrumed at their angles at 8 to standards or brackets 9, secured to and depending from the sides of the frame. The standards or brackets 9 are approximately V-shaped and support arcuate bars 10 provided with series of perforations 11 adapted to receive bolts or other suitable fastening 12 for securing the upwardly extending arms of the adjusting levers at different points along the arcuate bars 10.

The lower arms of the adjusting levers extend in advance of the pivots 8 and are adapted to be swung upwardly and downwardly by the adjustment of the levers, thereby raising and lowering the frame of the plow. The traction or carrying wheels may be provided either with the flat peripheries or rims as shown in Fig. 2 or with rims of any desired construction.

The front caster wheel 2 is mounted in a fork 13 of a pivoted stem 14 mounted in a suitable bearing of the main frame and having keyed or otherwise secured to its upper end a horizontally disposed gear 15 which meshes with a worm 16 carried by a front horizontally disposed section 17 of a steering shaft 18. The steering shaft 18 which is arranged at an inclination is provided at its rear end with a steering wheel 19 and it is connected at its front end with the said front section 17 by a universal joint 20 which is preferably in the nature of a coupling rod but a joint of any desired construction may of course be employed, or if desired a piece of flexible shafting may be used for connecting the steering shaft with the front section 17. When the steering shaft is rotated motion is communicated from the worm 16 to the gear 15 which is a worm wheel and the spindle 13 is turned either to the right or left.

The carrying or traction wheels 3 are provided with inside sprocket wheels 21 mounted on the transverse shaft or axle 4 at the inner sides of the said wheels 3 and connected by sprocket chains 22 with sprocket pinions 23 keyed or otherwise secured to the terminal portions of a front transverse shaft 24 journaled in suitable bearings of the main frame at the front portion thereof. The front transverse shaft 24 is also provided at an intermediate point with a sprocket wheel 25 which is connected by a sprocket chain 26 with a sprocket wheel 27 which is mounted on a counter shaft 28.

The counter shaft 28 which is provided at its outer end with a combined balance wheel and pulley 29 has a crank 30 which is connected with a piston rod 31 of an internal combustion engine 32 of any desired construction. The band wheel or pulley 29 is adapted to be connected by a belt 33 with a small pulley 34 to which is connected a band wheel or pulley 35 and the latter is adapted to be connected by a belt with any suitable machine for operation independently of the plow. Suitable clutches, not shown are designed in practice to be provided for disconnecting the engine 32 from the wheels of the plow and a combustion engine 36 which is connected with the cultivator disks 7 may also by similar means be disconnected from the same to enable it to be used for other purposes. The machine which may be constructed of any desired size is designed to travel at a speed of about two miles an hour when plowing or harrowing which is a considerable increase in speed over that attained by traction engines employed for this purpose but the speed may of course be varied to suit requirements.

The main frame is equipped at the back with depending downwardly and forwardly curved plow beams 37 provided with horizontally disposed lower terminal portions 38 having longitudinal slots 39 in which are adjustably mounted the terminal portions of a transverse shaft 40 upon which the cultivator disks are mounted. The terminal portions of the plow beams are provided with a series of perforations 41 adapted to receive bolts 42 or other suitable fastening devices for securing the shaft 40 in its adjustment. The terminals of the shaft 40 are adapted to be moved backwardly and forwardly in the slots 39 to set the shaft and the disks at the desired angle to secure the desired throw or turning of the soil.

The cultivator disks 7 which are designed to have a greater concave than the ordinary cultivator disks will in practice be constructed of chilled iron so that when they encounter an obstruction they will break and thereby prevent injury to the other portions of the machine. The disks may be made of any desired diameter to enable them to penetrate the soil to the required depth.

In practice, any suitable means may be employed for detachably securing the hub portion of the disks to the transverse shaft so that the disks may be quickly applied to and removed from the said shaft. The disks may be varied in number and size to suit the requirements of the soil operated on and the transverse shaft 40 is provided at its terminal portions with sprocket wheels 43 which are connected by sprocket chains 44 with sprocket pinions 45 mounted on a rear transverse shaft 46 which is journaled in suitable bearings of the main frame of the motor plow at the rear portion thereof. The transverse shaft 46 also carries a sprocket wheel 46ª which is connected by a sprocket chain 47 with a sprocket wheel 48 of a short counter shaft 49 journaled in suitable bearings of the main frame of the motor plow and equipped at its outer end with a fly wheel 50 which may be in the form of a pulley. The counter shaft 49 is provided with a crank 51 which is connected with the piston 52 of the engine 36. The engines 32 and 36 are located at opposite sides of the machine and faced from the front and rear to economize the space. The engine 36 which may be of any desired power is adapted to rotate the disks forwardly but reversing mechanism may of course be employed for enabling the disks to be rotated in either direction. The cultivator disks are designed to be rotated at a speed, say from fifty to two hundred and fifty revolutions per minute according to the character of the soil.

The machine is equipped at its rear end with a seeder attachment 52 which may be of any preferred construction and as any form of seeder attachment may be employed a detail description thereof is deemed unnecessary.

In practice, the machine may be equipped with a dynamo and a search light for enabling it to be operated at night. The cultivator disks are rotated independently of the traction or carrying wheels and the speed of the machine may be used for modifying the action of the cultivator disks. Also in practice the frame of the machine may be constructed of pivotally connected sections so that the rear section carrying the cultivator disks may be adjusted laterally with respect to the front section.

What is claimed is:—

1. A motor plow of the class described including a frame having spaced sides provided at their rear ends with downwardly and forwardly extending portions forming beams and having forwardly extending terminal horizontal portions, brackets depending from the sides of the frame in advance of the plow beams, adjusting levers fulcrumed on the brackets, carrying wheels carried by the said levers for raising and lowering the frame, a transverse angularly disposed shaft adjustably mounted on the horizontal portions of the said beams and provided at intervals with disks fixed to the shaft, an upper transverse shaft mounted on the frame and extending across the same, gearing connecting the ends of the upper transverse shaft with first mentioned transverse shaft for rotating the disks, and means for actuating the upper transverse shaft.

2. A motor plow of the class described including a frame having spaced sides provided with downwardly and forwardly extending portions forming plow beams and having forwardly extending horizontal terminal portions, brackets depending from the sides of the frame in advance of the said beams and having oppositely inclined portions, approximately L-shaped levers fulcrumed at their angles at the bottom of the brackets and having forwardly extending horizontal arms and upwardly extending arms located between the inclined sides of the brackets, means for adjusting the levers for raising and lowering the frame, a lower transverse shaft adjustably mounted on the horizontal extensions of the beams and disposed diagonally at an angle to the line of draft and provided with disks fixed to the said shaft, an upper transverse shaft extending across the frame, gearing connecting the said shafts, and means for rotating the upper shaft for driving the disks.

In testimony whereof I affix my signature in presence of two witnesses.

STEPHEN W. SMITH.

Witnesses:
    JAMES S. McGINNIS,
    FRANK SPINELLI.